United States Patent [19]
Iwasaki

[11] Patent Number: 5,661,587
[45] Date of Patent: Aug. 26, 1997

[54] OPTICAL SCANNING SYSTEM

[75] Inventor: Takeo Iwasaki, Nagoya, Japan

[73] Assignee: Brother Kogyo Kabushiki Kaisha, Aichi-ken, Japan

[21] Appl. No.: 319,050

[22] Filed: Oct. 6, 1994

[30] Foreign Application Priority Data

Oct. 27, 1993 [JP] Japan ................... 5-268563

[51] Int. Cl.$^6$ .................................. G02B 26/08
[52] U.S. Cl. .................. 359/205; 359/196; 359/216; 359/217; 347/259
[58] Field of Search ................... 359/196, 197, 359/198, 205, 206, 207, 216, 218, 217; 346/108, 160; 347/259–261; 250/230, 234, 236

[56] References Cited

U.S. PATENT DOCUMENTS

| | | | |
|---|---|---|---|
| 4,586,782 | 5/1986 | Sakuma et al. | 359/212 |
| 4,630,130 | 12/1986 | Parisi. | |
| 4,745,416 | 5/1988 | Horihata | 347/259 |
| 4,960,312 | 10/1990 | Razzaghi | 359/205 |
| 5,095,383 | 3/1992 | Omura et al. | 359/216 |
| 5,191,463 | 3/1993 | Minoura | 359/218 |
| 5,221,986 | 6/1993 | Itabashi | 359/206 |

FOREIGN PATENT DOCUMENTS

| | | |
|---|---|---|
| 62-237-419 | 10/1987 | Japan. |
| 5-346-553 | 12/1993 | Japan. |
| 6-018-800 | 1/1994 | Japan. |

*Primary Examiner*—Paul M. Dzierzynski
*Assistant Examiner*—Darren E. Schuberg
*Attorney, Agent, or Firm*—Oliff & Berridge

[57] ABSTRACT

An optical scanning system including a light source which emits a light beam; a light deflector having at least one reflecting surface providing a deflecting surface for deflecting the light beam emitted by the light source, in a deflection plane defined by the light beam incident to the light deflector and the light beam deflected by the light deflector; and a light-converging device which receives the light beam deflected by the light deflector and forms an optical image on an object to be scanned, an optical axis of the light-converging device being spaced from, and extending parallel to, the deflection plane.

23 Claims, 7 Drawing Sheets

OPTICAL SCANNING SYSTEM

BACKGROUND OF THE INVENTION

1. Field of the Invention

The present invention relates to an optical scanning system which forms an optical image on an object and scans the object by sweeping the optical image over the object.

2. Related Art Statement

There is known a laser printer including an optical scanning system wherein an image-forming lens is provided with a non-reflective coating for preventing a ghost beam from being reflected therefrom and thereby preventing a ghost image from being formed on an object by the ghost beam subsequently reflected by one of mirror surfaces of a polygon mirror.

In addition, U.S. Pat. Nos. 5,191,463, 4,745,416, and 4,586,782 disclose the art of preventing a ghost image from being formed on an image surface.

In the above-indicated conventional optical scanning system, however, since the non-reflective coating must be provided on the image-forming lens for preventing the ghost image from being formed by the light beam partly reflected from the lens, an increased number of working steps are needed for producing the lens. In addition, the ghost-image preventing techniques disclosed by the above-indicated patents suffer from the problems explained in detail later.

Moreover, U.S. Pat. No. 4,586,782 discloses an optical scanning system wherein the optical axis of an image-forming lens is inclined with respect to a deflection plane defined by a light beam incident to a polygon mirror and the light beam deflected toward the lens by the mirror surfaces of the polygon mirror. However, the center line of the mirror surfaces of the polygon mirror parallel to the top and bottom edge lines of the mirror surfaces is aligned with, and is contained by, the deflection plane. However, the width or thickness, W, of the mirror surfaces of the polygon mirror cannot be reduced to smaller than about 3 mm because, if the width W becomes smaller than 3 mm, the mirror surfaces cannot be formed with satisfactory accuracy and accordingly the amount of distortion of an optical image formed on an object becomes excessively large. Therefore, the angle of inclination of the optical axis of the image-forming lens cannot be reduced from a certain lower limit, and similarly the amount of distortion of the optical image cannot be reduced from a certain lower limit.

SUMMARY OF THE INVENTION

It is therefore an object of the present invention to provide an optical scanning system which effectively prevents the formation of a ghost image without increasing the number of working steps needed for producing an image-forming device such an optical lens.

The above object has been achieved by the present invention. According to a first aspect of the present invention, there is provided an optical scanning system comprising (a) a light source which emits a light beam, (b) a light deflector having at least one reflecting surface providing a deflecting surface for deflecting the light beam emitted by the light source, in a deflection plane defined by the light beam incident to the light deflector and the light beam deflected by the light deflector, and (c) a light-converging device which receives the light beam deflected by the light deflector and forms an optical image on an object to be scanned, an optical axis of the light-converging device being spaced from, and extending parallel to, the deflection plane.

in the optical scanning system in accordance with the first aspect of the invention, the light beam emitted from the light source is deflected by the light deflector, and then received by the light-converging device, so that an optical image is formed on an object to be scanned. Although the light beam incident to the light-converging device is partly reflected by the light-converging device, the reflected light returns toward the light deflector with an appropriate angle relative to the deflection plane defined by the light beam incident to the light deflector and the light beam deflected by the light deflector. Thus, the light reflected from the light-converging device is not reflected again by the light deflector. Since the light-converging device does not require any non-reflective coating, the present optical scanning system enjoys the advantage of effectively preventing the formation of a ghost image by the light beam partly reflected from the light-converging device, without increasing the number of working steps needed for producing the light-converging device.

In a preferred embodiment in accordance with the first aspect of the invention, the optical axis of the light-converging device is translated from the deflection plane by a distance which ensures that a deflection amount, S, of a ghost beam as the light beam partly reflected from the light-converging device, measured from the deflection plane at a position of the light deflector, satisfies a following expression: $2W > S > W/2$, where W is a width of the reflecting surface of the light deflector in a direction perpendicular to the deflection plane.

In another embodiment in accordance with the first aspect of the invention, the light-converging device comprises a plurality of optical members, an optical axis of at least one of the optical members being translated from the deflection plane.

According to a second aspect of the present invention, there is provided an optical scanning system comprising (a) a light source which emits a light beam, (b) a light deflector having at least one reflecting surface providing a deflecting surface for deflecting the light beam emitted by the light source, in a deflection plane defined by the light beam incident to the light deflector and the light beam deflected by the light deflector, the reflecting surface having two opposite, straight edge lines each of which is parallel to the deflection plane, a center line of the reflecting surface parallel to the two opposite edge lines being spaced from, and extending parallel to, the deflection plane, and (c) a light-converging device which receives the light beam deflected by the light deflector and forms an optical image on an object to be scanned, an optical axis of the light-converging device being inclined with respect to the deflection plane.

In the optical scanning system in accordance with the second aspect of the invention, the center line of the reflecting surface of the light deflector parallel to the two opposite edge lines of the reflecting surface is spaced from, and extends parallel to, the deflection plane, and the optical axis of the light-converging device is inclined with respect to the deflection plane. In the present optical scanning system, the angle of inclination of the optical axis of the light-converging device such as an optical lens can further be reduced, or even minimized, from the lower limit for the conventional optical scanning system wherein the center line of the mirror surfaces of the polygon mirror is aligned with the deflection plane. Accordingly, the amount of distortion of the optical image formed on the object can further be reduced from the lower limit for the conventional optical scanning system. In this case, too, the light-converging device does not require any non-reflective coating and therefore can be produced in a decreased number of workings steps.

In a preferred embodiment in accordance with the second aspect of the invention, a width of the light deflector equal to the distance between the two opposite edge lines is not smaller than 3 mm.

In another embodiment in accordance with the second aspect of the invention, the light deflector comprises a polygon mirror having a plurality of mirror surface as the at least one reflecting surface.

In yet another embodiment in accordance with the second aspect of the invention, the light-converging device comprises at least one lens, an optical axis of the lens being inclined with respect to the deflection plane.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
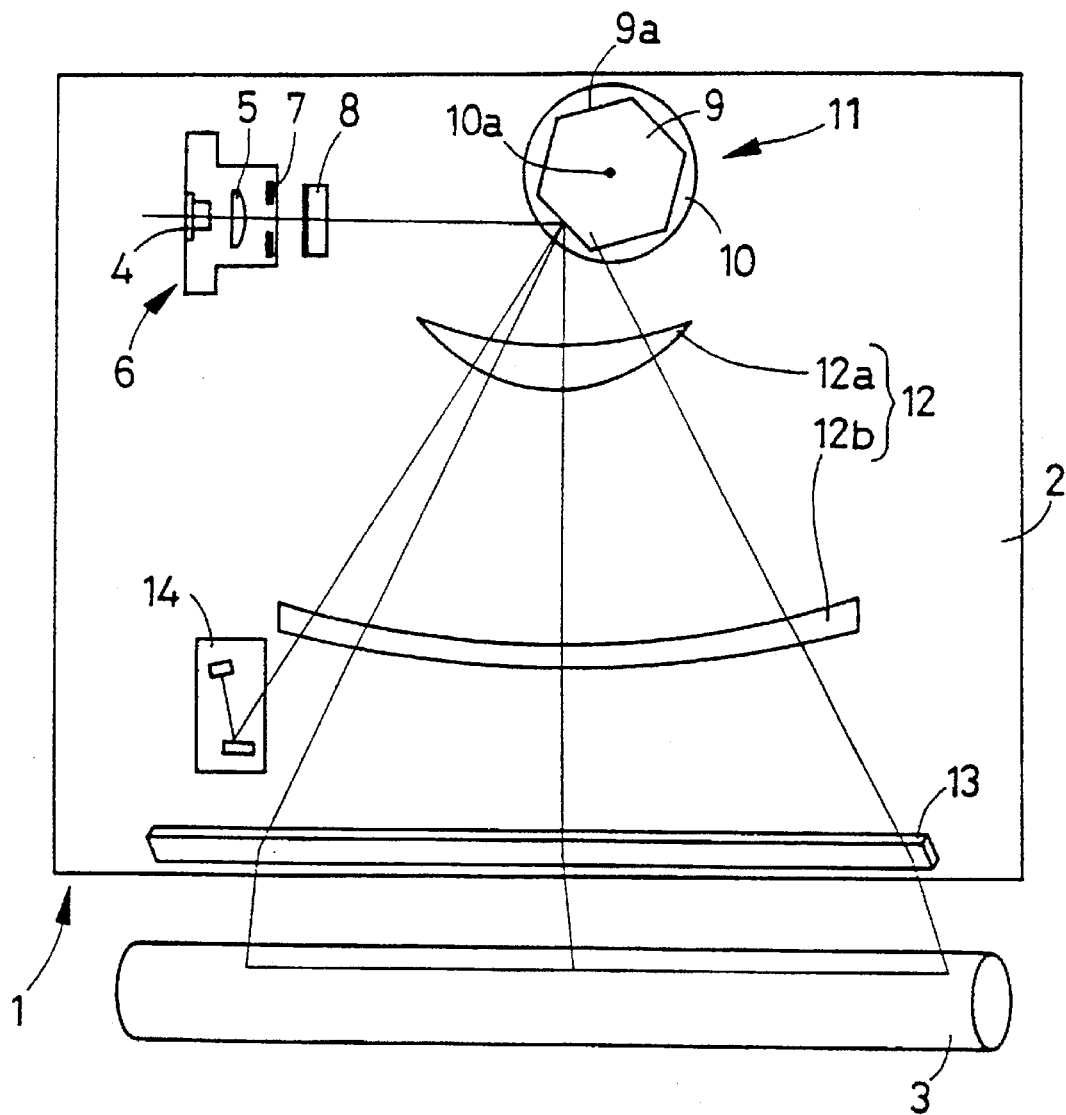
FIG. 1 is a plan view of an optical scanning system embodying the present invention.

Referring first to FIG. 1, there is shown an optical scanning system 1 for a laser printer to which the present invention is applied. There will be described the construction and operation of the optical scanning system 1 as a first embodiment of the invention.

The optical scanning system 1 includes a box-like housing 2 in which are disposed all elements necessary for producing a light beam to irradiate a recording medium in the form of a photosensitive drum 3. The housing 2 is formed of, e.g., a resin containing glass fibers dispersed therein. The housing 2 supports each element in position with high accuracy, so that an optical image to be formed on the drum 3 does not suffer distortion due to the vibration input to the housing 2.

The scanning system 1 further includes a laser unit 6. The laser unit 6 includes a light source 4 which emits a laser beam, a collimator lens 5, and a slit 7. The three elements 4, 5, 7 are fixed, as the laser unit 6, to the housing 2.

The light source 4 includes a semiconductor laser device, and emits a laser beam which has been intensity modulated according to image signals or data supplied from an image-data supplying device (not shown) of the laser printer. The light beam emitted from the light source 4 is received by the collimator lens 5.

The collimator lens 5 is constituted by a single glass lens. The collimator lens 5 receives the light beam emitted from the light source 4, and forms the light beam into parallel rays of light.

The slit 7 is provided by a plate having a rectangular opening or window. The slit 7 defines the contour of the parallel rays of light as the output from the collimator lens 5, and also defines the diameter of the laser beam as the optical image formed on the photosensitive drum 3.

A cylindrical lens 8 is provided on an optical path of the light source 4. The cylindrical lens 8 is constituted by a single plastic lens. The cylindrical lens 8 receives the parallel rays of light via the slit 7 from the collimator lens 5, and converges the parallel rays into a linear image extending in a direction perpendicular to a rotation axis 10a of a drive motor 10, in the neighborhood of mirror surfaces 9a of a polygon mirror 9. The laser unit 6 and the cylindrical lens 8 cooperate with each other to provide a light source device.

The polygon mirror 9 and the drive motor 10 are fixed, as a mirror/motor unit 11, to the housing 2. The polygon mirror 9 is rotatable at a high and constant speed by the drive motor 10.

The polygon mirror 9 is produced by cutting an aluminum blank into a regular hexagonal bar, and six side faces of the hexagonal bar are mirror-finished to provide the mirror surfaces 9a. The tolerance of finishing of the mirror surfaces 9a falls in the range of about λ/4 (λ is the wavelength of the laser beam emitted from the light source 4), for avoiding excessive deformation of the shape of the laser beam as the optical image formed on the drum 3. The thickness or width, W (FIG. 3), of the polygon mirror 9 as measured in the direction of extension of the rotation axis 10a of the drive motor 10 ranges from about 3 to 4 mm. The polygon mirror 9 functions as a light-deflecting device.

Figure 3:
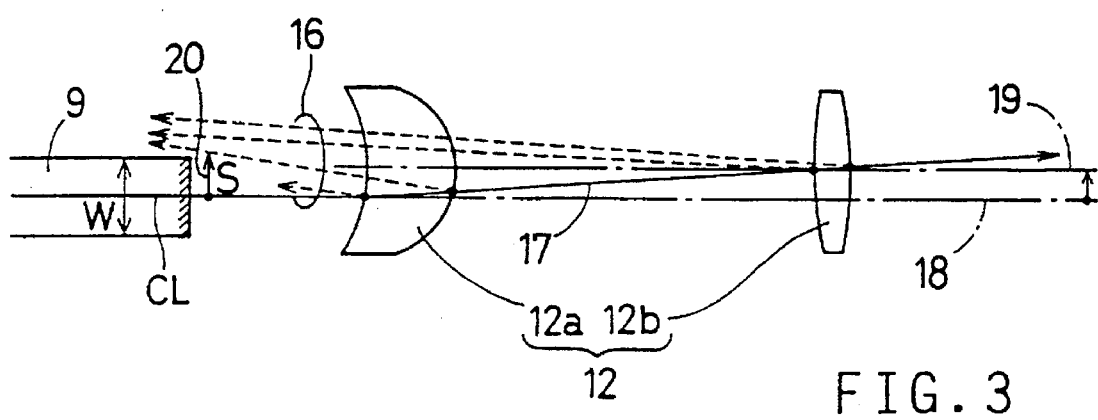
FIG. 3 is a cross-sectional view of a part of the optical scanning system of FIG. 1.

The drive motor 10 is of a DC (direct current) non-brush type, and is designed such that fluctuations of the rotation speeds thereof are limited to the range of ±about 0.01%. As the polygon mirror 9 is rotated about the axis 10a of the drive motor 10, the laser beam incident to a currently operative one of the six mirror surfaces 9a (hereinafter, referred to as the "deflecting surface 9a") is continuously deflected, so that the locus of the continuously deflected laser beam defines a deflection plane 18 (FIG. 3) perpendicular to the rotation axis 10a of the drive motor 10. In the present embodiment, the deflection plane 18 extends through a center line, CL, of the mirror surfaces 9a of the polygon mirror 9 which line is parallel to the top and bottom straight edge lines of the mirror surfaces 9a, as shown in FIG. 3.

An image-forming lens device 12 which functions as a light-converging device is constituted by two plastic lens 12a, 12b which function as a plurality of optical members of the light-Converging device. The lens device 12 forms an optical image on the photosensitive drum 3, from the laser beam deflected by the polygon mirror 9. The lens device 12 has a known F-θ characteristic so that the laser beam as the optical image formed on the drum 3 scans the drum 3 at a constant velocity. Since the plastic lenses 12a, 12b have no non-reflective coating, the reflection factor of each plastic lens 12a, 12b is about 5% per reflection. As shown in FIG. 3, an optical axis 19 of the lens device 12 is spaced upward from the deflection plane 18 and extends parallel to the deflection plane 18.

An elongate mirror 13 is provided between the lens device 12 (i.e., second lens 12b) and the photosensitive drum 3. The mirror 13 is produced by subjecting a glass plate to an aluminum vapor deposition. The mirror 13 folds, by reflection, the optical path of the laser beam following the lens device 12, so that the drum 3 can be disposed at a desired position in the housing 2.

The laser beam output from the lens device 12 (second lens 12b) can be directed to a beam detector unit 14 disposed outside an effective scanning area where the laser beam reflected by the polygon mirror 9 is effectively used to scan the photosensitive drum 3. The laser detector unit 14 includes a photoelectric transducer element such as a pin photodiode, and detects a current position of the laser beam being continuously deflected by the rotating polygon mirror 9. The detector unit 14 generates a detection signal which is utilized by a control device (not shown) to start supplying the image data to the light source 4 so that the laser beam bearing desired light information or image data scans desired areas of the drum 3.

The image data input via the laser beam to the photosensitive drum 3 in the above described manner, is developed by, e.g., a known electrophotographic process, and subsequently transferred to, and fixed on, a recording medium such as a common sheet or a special sheet. Thus, a hard copy of the original image data is output.

Figure 11:
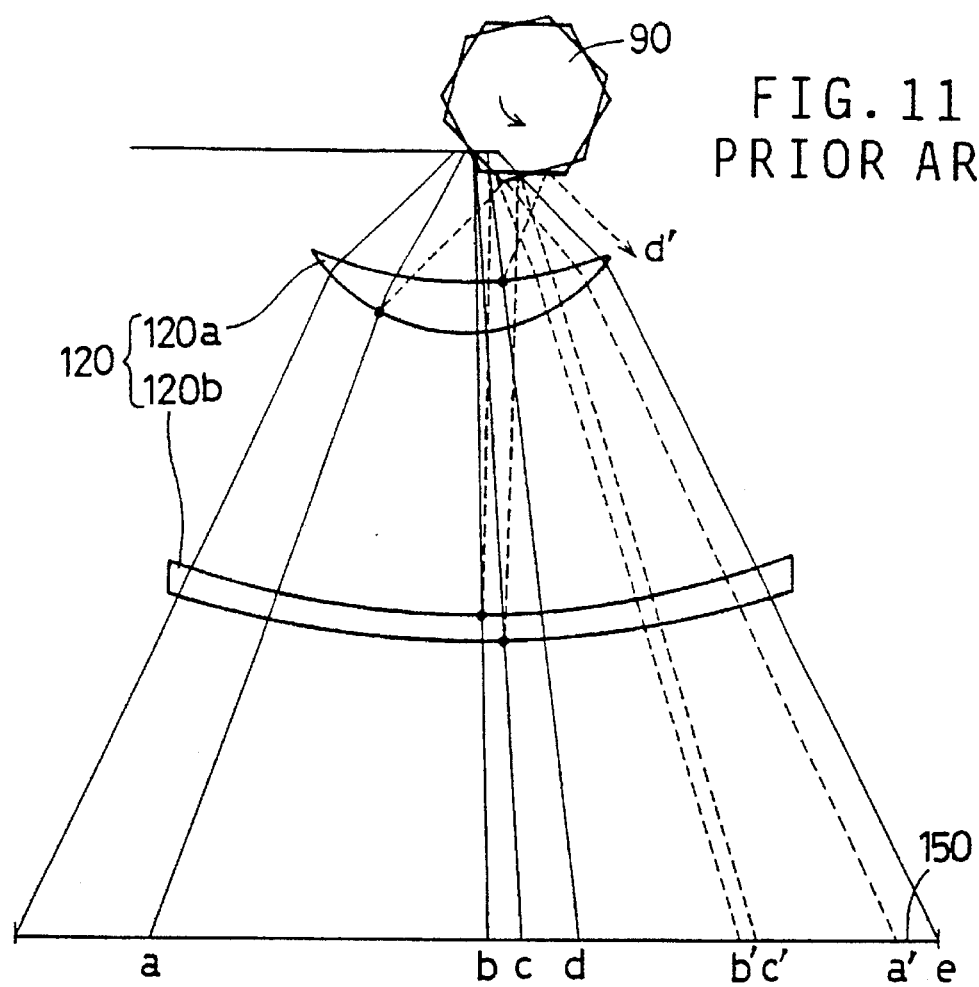
FIG. 11 is a plan view corresponding to FIG. 2, showing a part of a conventional optical scanning system.
Figure 12:
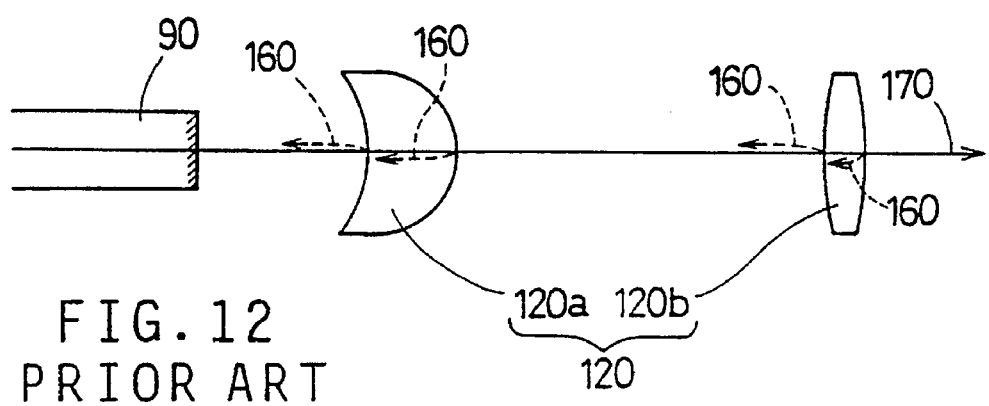
FIG. 12 is a cross-sectional view corresponding to FIG. 3, showing a part of the conventional optical scanning system of FIG. 11.

FIGS. 11 and 12 show a conventional optical scanning system. There will be described the reason why a ghost image is formed on a recording sheet.

As shown in FIG. 11, a laser beam is deflected by a deflecting surface as a currently operative one of six mirror surfaces of a polygon mirror 90. The laser beam deflected by the polygon mirror 90 is partly reflected by a rear surface of a first lens 120a of an image-forming lens device 120 and a front and a rear surface of a second lens 120b of the lens device 120, as indicated at corresponding incident angles, a, b, and c, each relative to an image surface or screen 150, i.e., outer circumferential surface of a photosensitive drum to be scanned. In this device, the two lenses 120a, 120b have no non-reflective coating. The laser beams reflected by the three surfaces of the lens device 120 are incident to a mirror surface adjacent to the deflecting surface. The laser beams reflected by the adjacent mirror surface of the polygon mirror 90 again pass through the lens device 120, and form respective ghost images on the screen 150. Since, as shown in FIG. 12, the optical axis of the lens device 120 is contained by a deflection plane defined by the locus of the laser beam continuously deflected by the polygon mirror 90, the laser beams reflected by the surfaces of the lens device 120 return to the adjacent mirror surface of the polygon mirror 90 via other optical paths in the deflection plane.

Here, the intensity or power of each of three ghost beams 160 (indicated at broken line) respectively reflected by the three surfaces of the lens device 120, is compared with the power of a scanning beam 170 (indicated at solid line) to sweep the screen 150. Provided that the reflection factor of the lens device 120 be 5% per reflection (i.e., per surface), the transmission factor of the lens device 120 be 95% per transmission (i.e., per surface), and the reflection factor of the deflecting surface of the polygon mirror 90 be 90% per reflection, the ratio of the power of each of the three ghost beams 160 reflected by the rear surface of the first lens 120a and the front and rear surfaces of the second lens 120b, to the power of the scanning beam 170 is 4.1%, 3.7%, and 3.3%, respectively. These ratios or powers of the ghost beams 160 are considerably high and cannot be ignored. In fact, the respective ghost images formed by those ghost beams 160 at undesired locations are developed by a common electrophotographic process, and printed as thin images on the recording sheet. In the case where a laser beam is reflected twice or more by each surface of the lens device 120, the power of the resulting ghost beam does not exceed 0.25%, under the same conditions as described above. This low power of the ghost beam provides no problem where the latent images formed on the photosensitive drum are developed by a common electrophotographic process.

In the case where each of the two lenses 120a, 120b of the image-forming lens device 120 has a non-reflective coating, the power of each of three ghost beams 160 respectively reflected by the rear surface of the first lens 120a and the front and rear surfaces of the second lens 120b, is compared with the power of a scanning beam 170 to sweep a screen 150, under the conditions that the reflection factor of the lens device 120 be 1% per reflection, the transmission factor of the lens device 120 be 99% per transmission, and the reflection factor of the deflecting surface of the polygon mirror 90 be 90% per reflection. In this case, the ratio of the power of each of the three ghost beams 160 reflected by the three faces of the lens device 120, to the power of the scanning beam 170 is 0.88%, 0.86%, and 0.85%, respectively. These ratios or powers of the ghost beams 160 do not produce the problem that ghost images are formed on a recording sheet, therefore no countermeasure has been needed. However, to provide a non-reflective coating on each lens 120a, 120b of a considerably great size results in increasing the number of working steps required to manufacture the lens 120a, 120b, as compared with the case where a lens 120a, 120b without any non-reflective coating is manufactured. Consequently, the production cost of the conventional optical scanning device is increased.

Referring back to FIG. 11, the lens device 120 includes a front surface of the first lens 120a, as the fourth surface that partly reflects the baser beam reflected from the deflecting surface of the polygon mirror 90, as indicated at a corresponding incident angle, d, relative to the screen 150. However, the laser beam reflected by the front surface of the first lens 120a cannot again transmit the lens device 120, or reach the screen 150, after being reflected by the adjacent surface of the polygon mirror 90 adjacent to the deflecting surface thereof. Thus, it is possible to eliminate a ghost image by selecting an appropriate curvature of each lens 120a, 120b of the lens device 120, an appropriate number and/or shape of the mirror surfaces of the polygon mirror 90, and/or an appropriate incident angle of the laser beam relative to the polygon mirror 90. However, for some lenses 120a, 120b having particular dimensions, there may be no solution to eliminate a ghost image.

There is known the technique of removing a ghost beam by disposing, in a box-like housing, a light-shading device outside the effective scanning area defined by the locus of the laser beam continuously deflected by the polygon mirror 90. This technique, however, cannot remove a ghost beam to form a ghost image inside a limit-defining end of the effective scanning area indicated at a corresponding incident angle, e. In the prior scanning system, ghost images, a', b', and c' are formed by the ghost beams a, b, c, whose optical paths fall within the effective scanning area. Therefore, this technique cannot be employed for the present optical scanning system 1.

U.S. Pat. No. 4,586,782 that has been discussed above discloses an optical scanning system wherein the optical axis of an image-forming lens is inclined with respect to a deflection plane in which the laser beam is continuously deflected by a polygon mirror. This technique is sufficiently effective in preventing a ghost beam reflected by the image-forming lens, from actually forming a ghost image. However, the tolerance of positioning of the image-forming lens is very small, and it is required that a box-like housing support the inclined image-forming lens with higher positioning precision than a box-like housing to support an image-forming lens vertically in such a manner that the optical axis of the image-forming lens is parallel to the deflection plane. Therefore, both in the case where the box-like housing is a product obtained by cutting a blank, and in the case where the housing is a product obtained by casting a material into a metallic mold, the number of working steps required to provide a reference plane for positioning of the image-forming lens is increased. In addition, the number of working steps required to check the reference plane is also increased. Thus, the production cost of the prior scanning system is raised.

Next, there will be described the reason why the optical scanning system 1 in accordance with the present embodiment can eliminate a ghost image, by reference to FIGS. 2 and 3.

Figure 2:
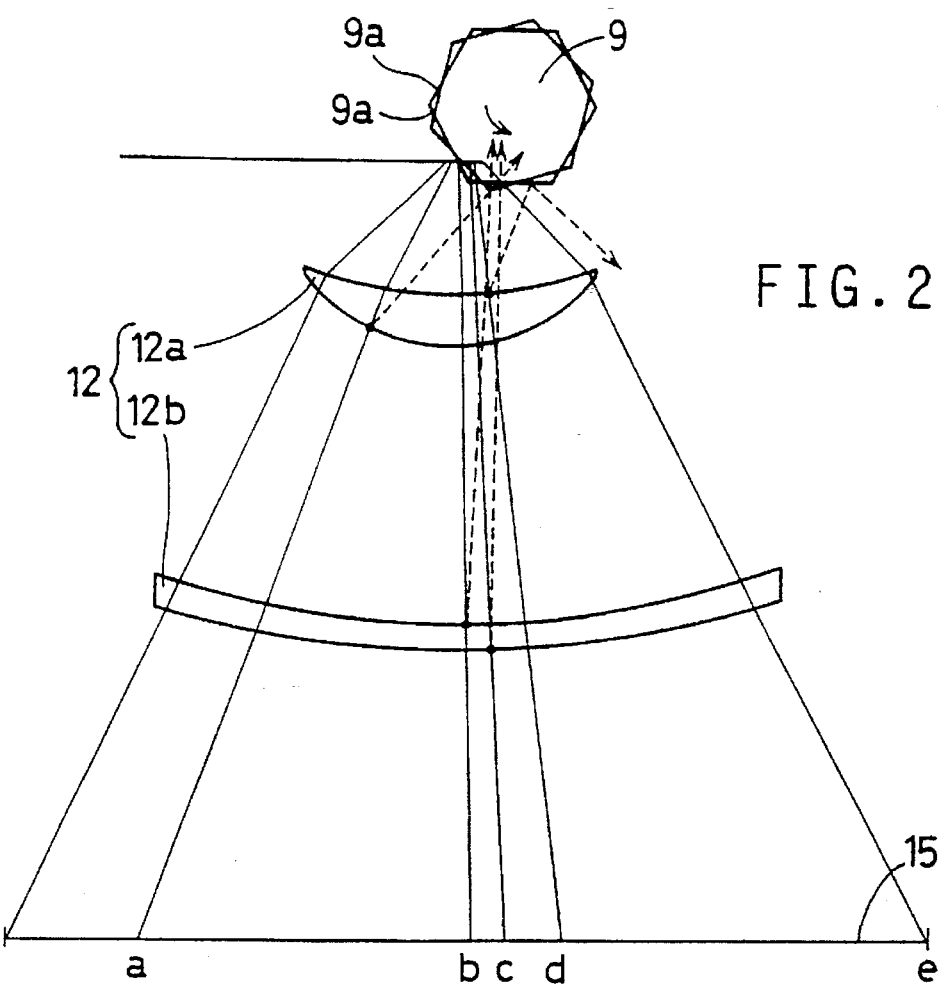
FIG. 2 is a plan view of a part of the optical scanning system of FIG. 1.

In FIG. 2, the laser beam deflected by the deflecting surface 9a of the polygon mirror 9 is partly reflected by the rear surface of the first lens 12a and the front and rear surfaces of the second lens 12b, as indicated at the respective incident angles a, b, c relative to a screen 15, i.e., outer surface of the photosensitive drum 3, and is directed toward the polygon mirror 9. However, since the optical axis 19 of each of the two lenses 120a, 120b of the image-forming lens device 120 is translated upward from the deflection plane 18 as can be seen in FIG. 3, the laser beams reflected from the three surfaces of the lens device 12 do not impinge on any mirror surface 9a of the polygon mirror 9. This is explained in more detail by reference to FIG. 3, below.

As shown in FIG. 3, the laser beam reflected by the deflecting surface 9a of the polygon mirror 9 is partly reflected by the rear (i.e., second) surface of the first lens 12a and the front (i.e., third) and rear (i.e., fourth) surfaces of the second lens 12b, and the reflected beams return as ghost beams 16 toward the polygon mirror 9. However, since the optical axis 19 of the image-forming lens device 12 is translated upward from the deflection plane 18, the three ghost beams 16 reflected from the lens device 12 pass through respective optical paths each indicated at broken line toward a vacant space above the polygon mirror 9. Thus, the ghost beams 16 reflected from the three surfaces of the lens device 12 do not impinge on any mirror surface 9a of the polygon mirror 9.

Respective deflection amounts, S, 20 of the ghost beams 16 from a center line, CL, of the mirror surfaces 9a of the polygon mirror 9, i.e., from the deflection plane 18, as measured at the position of the mirror surfaces 9a of the polygon mirror 9 is calculated by reference to an example wherein a thickness or width, W, of the mirror surfaces 9a is 4 mm; the distance between the mirror surface 9a of the polygon mirror 9 that is the nearest to the front (i.e., first) surface of the first lens 12a, and the front surface of the first lens 12a is about 25 mm; the amount of upward translation of the optical axis 19 of the lens device 12 from the deflection plane 18 is 1 mm; the curvature of the front surface of the first lens 12a is 120 mm; the curvature of the rear face of the first lens 12a is 45 mm; the respective curvatures of the front surface of the second lens 12b as taken in a main and a secondary laser-beam scanning direction are 300 mm and 25 mm, respectively (the main scanning direction is parallel to a longitudinal axis line of the drum 3, and the secondary scanning direction is perpendicular to the main scanning direction); the curvature of the rear surface of the second lens 12b is 3000 mm; the distance between the front and rear surfaces of the first lens 12a equal to the length of the optical axis of the first lens 12a is 12 mm; the distance between the rear surface of the 12a and the front surface of the second lens 12b is 65 mm; the distance between the front and rear surfaces of the second lens 12b equal to the length of the optical axis of the second lens 12b is 4 mm; each lens 12a, 12b is formed of PMMA (i.e., polymethylmethacrylate); and the refraction factor of each lens 12a, 12b is 1.49. The deflection amount S 20 for the ghost beam 16 reflected from the front surface of the first lens 12a is calculated as 0.41 mm; the deflection S 20 for the ghost beam 16 reflected from the rear surface of the first lens 12a is 2.2 mm; the deflection S 20 for the ghost beam 16 reflected from the front surface of the second lens 12b is 2.4 mm; and the deflection S 20 for the ghost beam 16 reflected from the rear surface of the second lens 12b is 2.9 mm.

Thus, substantially no power of the ghost beams 16 reflected from the rear surface of the first lens 12a and the front and rear surfaces of the second lens 12b is input to the mirror surfaces 9a of the polygon mirror 9. Since the degree of convergence of each ghost beam 16 is much lower than that of the laser beam initially incident to the deflecting surface 9a of the polygon mirror 9, substantially no power of the ghost beam impinges the mirror surfaces 9a of the polygon mirror 9. Even if a portion of each ghost beam 16 is input to the polygon mirror 9, the input power of the ghost beam is very low, making substantially no contribution to forming a ghost image on the screen 15.

In addition, the ghost beam reflected from the front surface of the first lens 12a impinges one mirror surface 9a of the polygon mirror 9 adjacent to the deflecting surface 9a, but this ghost beam does not form a ghost image on the screen 15 for the reasons explained above with reference to the optical path corresponding to the incident angle d.

It is preferred that the amount of translation of the optical axis 19 of the image-forming lens device 12 from the deflection plane 18 be selected at the least possible value necessary to remove the ghost images.

If the translation amount of the optical axis 19 from the deflection plane 18 is increased, the optical characteristics of the lens device 12 are lowered, in particular, the amount of aberration of the laser beam as the optical image formed on the screen 15 is increased. For this reason, the amount of translation of the optical axis 19 should be held as small as possible.

Figure 4:
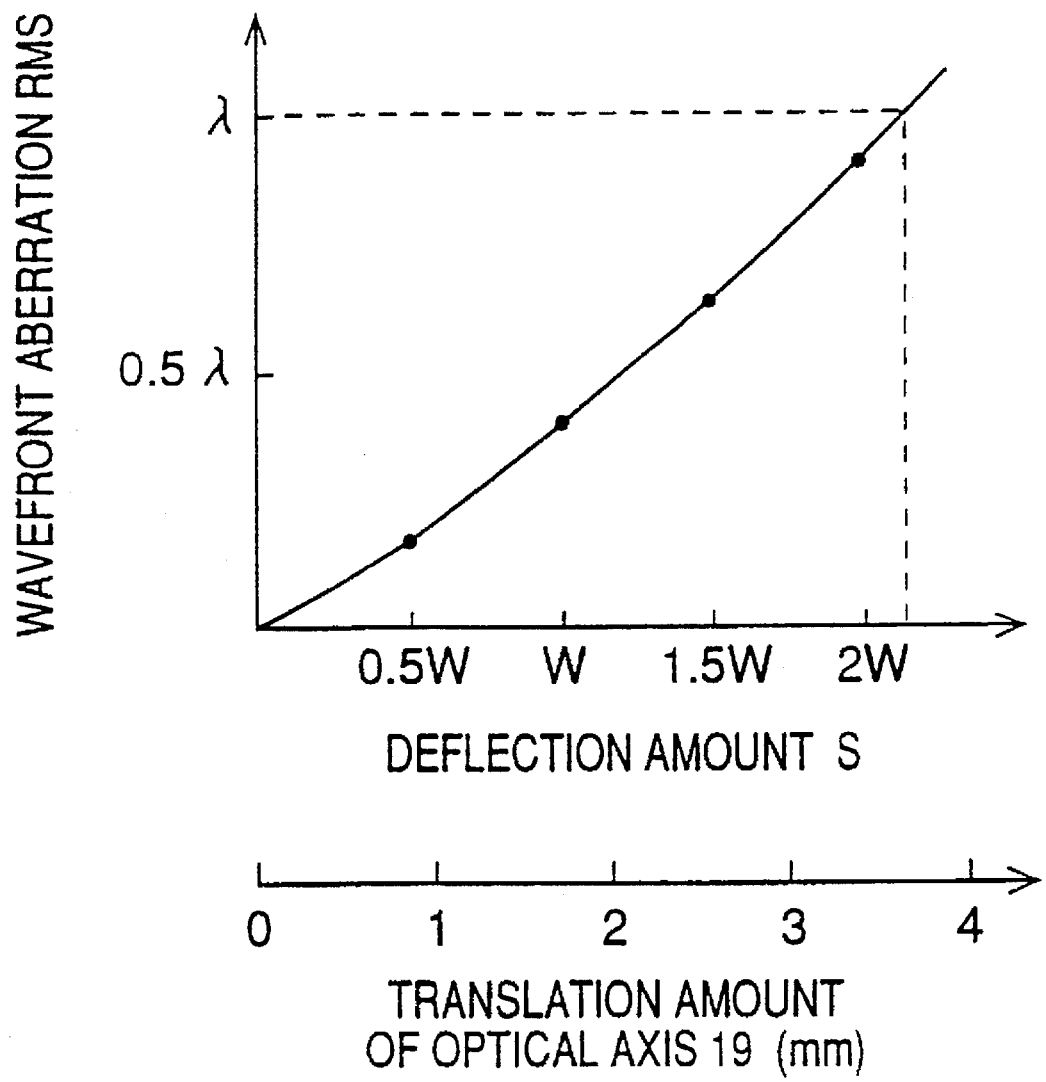
FIG. 4 is a graph showing a relationship between the translation amount of an optical axis 19 of an image-forming lens device 12 and the wavefront aberration RMS of an image-forming beam 17 in the optical scanning system of FIG. 1.

FIG. 4 shows an example of a relationship between (A) wavefront aberration, RMS, of the laser beam as the optical image formed on the screen 15 and (B) (b1) deflection amount S of the ghost beam 16 and (b2) translation amount of the optical axis 19 of the lens device 12. It can be understood from this relationship that if the translation amount of the optical axis 19 is excessively increased, the quality of the laser beam as the optical image formed on the screen 15 is largely lowered. The quality of the laser beam as the optical image formed on the screen 15 may be guaranteed by maintaining the wavefront aberration RMS within one wavelength, $\lambda$, of the laser beam emitted by the light source 4 (i.e., RMS<$\lambda$). It is desirable that a scanning laser beam 17 form an optical image on the screen 15 with the smallest possible wavefront aberration RMS.

As can be understood from the foregoing description, each ghost beam 16 does not form a ghost image if the deflection S 20 of each ghost beam 16 from the deflection plane 18 and the width W of the mirror surfaces 9a of the polygon mirror 9 satisfy the following expression: S>W/2.

In addition, if the deflection S and the width W satisfy the following expression: 2W>S>W/2, the scanning beam 17 forms an excellent optical image on the screen 15 or photosensitive drum 3, with a small wavefront aberration RMS in spite of the translation of the optical axis 19 of the image-forming lens device 12 from the deflection plane 18.

Figure 5:
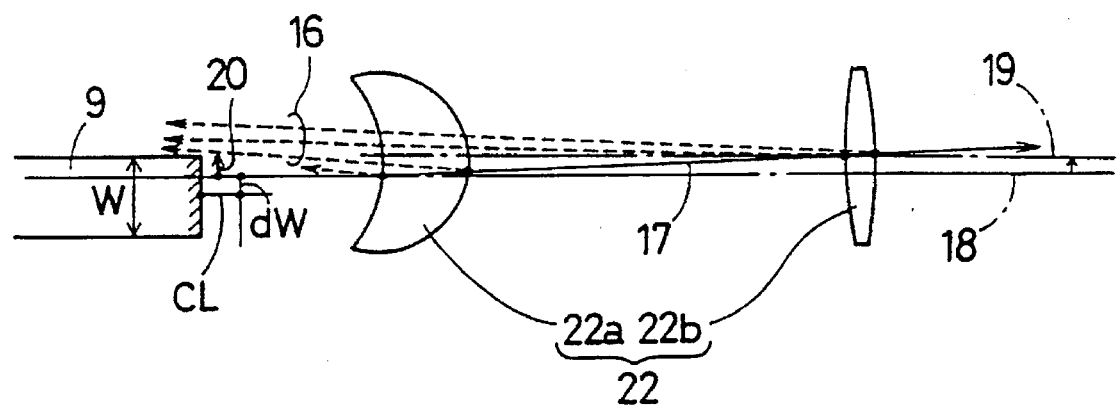
FIG. 5 is a cross-sectional view corresponding to FIG. 3, showing a part of another optical scanning system as a second embodiment of the present invention.

Referring next to FIG. 5, there is shown a second embodiment of the present invention. The second embodiment also relates to an optical scanning device wherein, however, the translation amount of an image-forming lens device 22 from the deflection plane 18 is smaller than that for the first embodiment shown in FIG. 3. The scanning device in accordance with the second embodiment also enjoys the advantage of eliminating a ghost image. The same numerals as used in the first embodiment are used to designate the corresponding elements of the second embodiment, and the repetitive description of those elements is omitted.

The second embodiment is different from the first embodiment only in that the deflection plane 18 is translated by, e.g., one mm from the center line CL of the mirror surfaces 9a of the polygon mirror 9, in the same direction as the direction in which an optical axis 19 of the image-forming lens device 22 is translated from the deflection plane 18.

In the second embodiment, therefore, the amount of translation of the image-forming lens device 22 from the deflection plane 18 is smaller than that of the image-forming lens device 12 for the first embodiment. For example, the former may be half the latter. From FIG. 5, it is easily understandable that, even in such a case, the lens device 22 and the polygon mirror 9 can be constructed such that each of ghost beams 16 reflected from front and rear surfaces of two lenses 22a, 22b of the lens device 22 does not impinge any mirror surfaces 9a of the polygon mirror 9.

Each ghost beam 16 does not form a ghost image if a deflection S 20 of each ghost beam 16 from the deflection plane 18, width W of the mirror surfaces 9a of the polygon mirror 9, and a translation amount, dW, of the deflection plane 18 from the center line CL of the mirror surfaces 9a satisfy the following expression: S>W/2−dW, where dW is a positive value if the deflection plane 18 is translated in the same direction as the direction in which each ghost beam 16 is deflected.

Moreover, if the deflection S, width W, and translation amount dW satisfy the following expression: 2W>S>W/2−dW, a scanning laser beam 17 forms an excellent optical image on a screen 15 or a photosensitive drum 3, with a small wavefront aberration RMS in spite of the translation of the optical axis 19 of the image-forming lens device 22 from the deflection plane 18.

It emerges from the foregoing description that both the first and second embodiments enjoys the advantage of eliminating a ghost image, without increasing the number of working steps required for producing the image-forming lens device 12, 22 or the box-like housing 2.

Referring back to FIG. 1, there will be described the operation of the optical scanning device 1 in accordance with the first embodiment. However, the following description also applies the optical scanning device in accordance with the second embodiment shown in FIG. 5.

The light source 4 flashes according to the image data supplied from the image-data supplying device of the laser printer, thereby producing a laser beam representing the image data. The laser beam passes through the collimator lens 5, which forms it into parallel rays of light. The slit 7 shapes the contour of the parallel rays of light, and the thus shaped laser beam is output from the laser unit 6. The cylindrical lens B converges the laser beam into a linear optical image which is incident near the mirror surfaces 9a of the polygon mirror 9. Since the polygon mirror 9 is rotated at a constant velocity by the drive motor 10, the laser beam or linear image is deflected at a constant angular velocity by the deflecting surface 9a of the polygon mirror 9, and the deflection plane 18 is thus defined. The laser beam deflected by the polygon mirror 9 is converged by the image-forming device 12 so that the laser beam provides an optical image on the photosensitive drum 3. The lens device 12 refracts the optical path of the laser beam deflected by the polygon mirror 9 at the constant angular velocity, so that the scanning beam 17 sweeps the drum 3 at a constant velocity.

The laser beam incident to the image-forming lens device 12 is partly reflected by the front and rear surfaces of the two lens 12a, 12b of the lens device 12, and goes back toward the polygon mirror 9. In the optical scanning system 1, however, almost all the power of the reflected laser beams is not again reflected by the polygon mirror 9, since the optical axis 19 of the lens device 12 is translated from the deflection plane 18. The power of the reflected laser beams eventually input to the photosensitive drum 3 is very small and can be ignored.

The laser beam converged by the image-forming lens device 12 is reflected by the elongate mirror 13, so that the optical path of the laser beam is folded. Then, the laser beam or scanning beam 17 forms the optical image on the photosensitive drum 3, and continuously sweeps the drum 3 at the constant velocity. The scanning beam 17 can be cast to the beam detector unit 14 disposed outside the effective scanning area, so that the detector unit 14 detects the current position of the scanning beam 17 and generates the detection signal representing the detected position of the scanning beam 17.

The photosensitive drum 3 is swept by the scanning beam 17 representing the image data, so that latent images are formed on the drum 3. The drum 3 is developed by, e.g., a known electrophotographic process, and transferred to, and fixed on, a recording sheet such as a common cut sheet or special sheet, so that the recorded sheet is output as a hard copy of the image data.

While the present invention has been described in its preferred embodiments, the present invention may otherwise be embodied.

Figure 6:
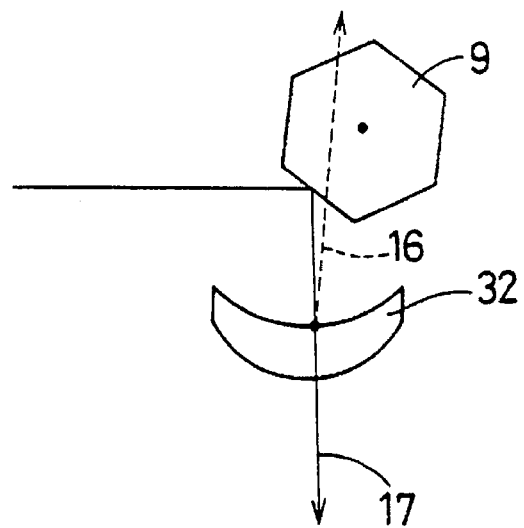
FIG. 6 is a plan view corresponding to FIG. 2, showing a part of another optical scanning system as a third embodiment of the present invention.

For example, as shown in FIG. 6, a ghost image may be formed by a ghost beam 16 reflected by not one adjacent surface 9a of the deflecting surface 9a of the polygon mirror 9 but the deflecting surface 9a itself. In this case, too, the ghost image is eliminated by translating the optical axis of an image-forming lens 32 from the deflection plane 18.

Figure 7:
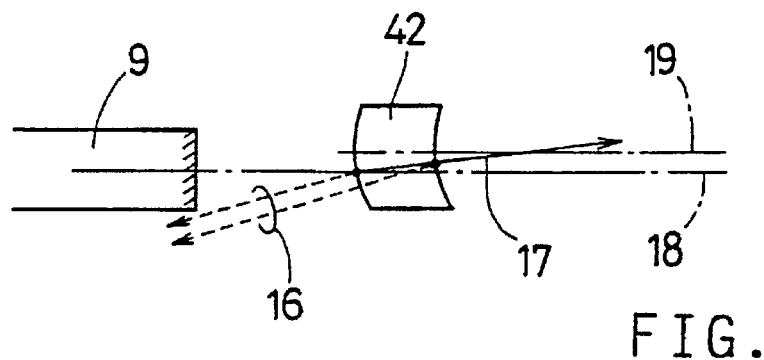
FIG. 7 is a cross-sectional view corresponding to FIG. 3, showing a part of another optical scanning system as a fourth embodiment of the present invention.

Furthermore, as shown in FIG. 7, an image-forming lens 42 having a convex front surface and a concave rear surface may be employed in place of the first lens 12a having the concave front surface and the convex rear surface. In this case, too, the same advantages as those of the optical scanning system 1 may be obtained by translating the optical axis of the image-forming lens 42 from the deflection plane 18.

Figure 8:
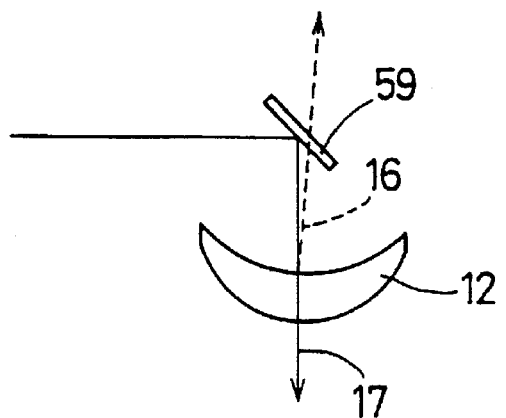
FIG. 8 is a plan view corresponding to FIG. 2, showing a part of another optical scanning system as a fifth embodiment of the present invention.

Additionally, as shown in FIG. 8, the rotary polygon mirror 9 may be replaced by a fixed or oscillating reflecting mirror 59. In this case, too, the same advantages as those of the optical scanning system 1 may be obtained by translating the optical axis of the image-forming lens 12 from a deflection plane defined by a laser beam incident to the reflecting mirror 59 and the laser beam deflected by the mirror 59.

Figure 9:
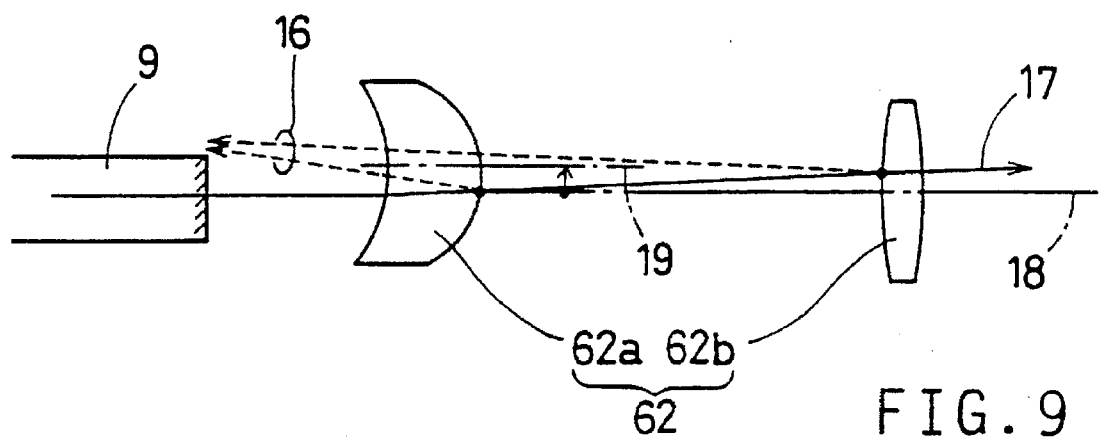
FIG. 9 is a cross-sectional view corresponding to FIG. 3, showing a part of another optical scanning system as a sixth embodiment of the present invention.

Moreover, as shown in FIG. 9, the same advantages as those of the optical scanning system 1 may be obtained by translating the optical axis of only one 62a of two lenses 62a, 62b of an image-forming lens device 62 from the deflection plane 18. In this case, a non-reflective coating may be provided on the second lens 62b that is not translated from the deflection plane 18. In the case where no ghost image is formed by the translation of only the first lens 62a, there is no need to provide the non-reflective coating on the second lens 62b.

The conventional optical scanning system wherein a ghost image is eliminated by inclining the optical axis of an image-forming lens with respect to a deflection plane, as disclosed by the previously-identified U.S. Pat. No. 4,586, 782, suffers from the same problem that the wavefront aberration is increased, because of the inclined optical axis of the image-forming lens. Since in the conventional system the deflection plane is aligned with the center line of the mirror surfaces of the polygon mirror, the angle of inclination of the optical axis of the image-forming lens cannot be reduced to less than a certain lower limit, under the condition that the thickness or width of the mirror surfaces of the polygon mirror cannot be reduced to less than about 3 mm. This problem has been solved by the present invention, as described below.

Figure 10:
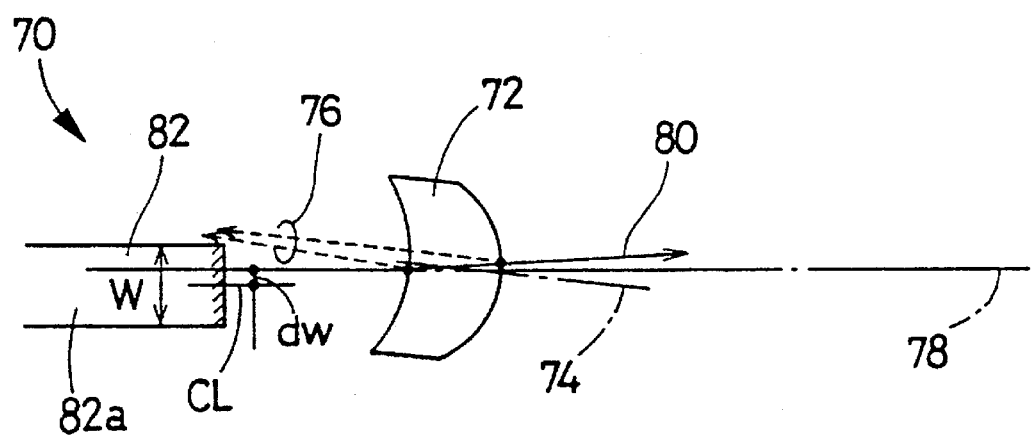
FIG. 10 is a cross-sectional view corresponding to FIG. 3, showing a part of another optical scanning system as a seventh embodiment of the present invention.

FIG. 10 shows another embodiment of the present invention wherein an optical axis 74 of an image-forming lens 72 is inclined with respect to a deflection plane 78 defined by a laser beam incident to a deflecting surface 82a of a polygon mirror 82, and the deflection plane 78 is translated by a small distance, dW, from a center line, CL, of the deflecting surface 82a of the polygon mirror 82, in the same direction as the direction in which ghost beams 76 are reflected from front and rear surfaces of the lens 72. In this case, the ghost images are eliminated while at the same time the amount of inclination of the optical axis 74 of the image-forming lens 72 is minimized. Since the inclination amount of the lens 72 is minimized, the amount of aberration of an optical image formed by a scanning laser beam 80 on a drum 3 or screen 15 is also minimized, and the quality of the scanning beam 80 is improved to a satisfactory degree.

It is to be understood that the present invention may be embodied with other changes, improvements, and modifications that may occur to those skilled in the art without departing from the spirit and scope of the invention defined in the appended claims.

What is claimed is:

1. An optical scanning system comprising;
a light source which emits a light beam;
a light deflector having at least one reflecting surface providing a deflecting surface for deflecting said light beam emitted by said light source, in a deflection plane defined by the light beam incident to said light deflector and the light beam deflected by the light deflector, said deflection plane being distant from a center line of said at least one reflecting surface in a direction perpendicular to the deflection plane; and
a light-converging device which receives said light beam deflected by said light deflector and forms an optical image on an object to be scanned, said light-converging device consisting of a plurality of optical members, an optical axis of each of said optical members of said light-converging device being spaced from said deflection plane in said direction perpendicular thereto, and extending parallel thereto, wherein said optical axis of said each optical member of said light-converging device is translated from said deflection plane by a distance which ensures that a deflection amount S of a ghost beam as the light beam partly reflected from said each optical member of said light-converging device, measured from the deflection plane at a position of said light deflector, satisfies a following expression: 2W>S>W/2−dW, where W is a width of said at least one reflecting surface of the light deflector in said direction perpendicular to the deflection plane and dW is a distance of the deflection plane from said center line of said at least one reflecting surface in said direction.

2. An optical scanning system according to claim 1, wherein said deflection amount S of said ghost beam satisfies a following expression: 2W>S>W, where W is said width of said reflecting surface of said at least one light deflector.

3. An optical scanning system according to claim 1, wherein said at least one reflecting surface of said light deflector has two opposite, straight edge lines each of which is parallel to said deflection plane.

4. An optical scanning system according to claim 1, wherein said each optical member of said light-converging device comprises a lens having a first and a second surface, said lens having an optical axis thereof as said optical axis of the light-converging device, a distance of translation of said optical axis of said each optical member of said lens from said deflection plane and at least one of (a) a distance between said light deflector and said first surface of said lens, (b) a distance between the light deflector and said second surface of said lens, (c) a length of the optical axis of said lens equal to a distance between said first and second surfaces measured on the optical axis of the lens, (d) respective curvatures of said first and second surfaces of said lens, and (e) a refraction factor of said lens being determined such that said deflection amount S of said ghost beam as the light beam partly reflected from each of said first and second surfaces of said lens satisfies said expression: 2W>S>W/2dW, where W is said width of said at least one reflecting surface of the light deflector.

5. An optical scanning system according to claim 1, wherein said optical axis of said each optical member of said light-converging device is translated from said deflection plane by a distance which ensures that a wavefront aberration of the light beam forming said optical image on said object is smaller than a wavelength of the light beam emitted by said light source.

6. An optical scanning system according to claim 1, wherein said light source comprises a laser light source which emits a laser beam as said light beam.

7. An optical scanning system according to claim 1, wherein said light deflector comprises:

a polygon mirror having a plurality of mirror surfaces as said at least one reflecting surface; and a drive motor which rotates said polygon mirror so that each of said mirror surfaces functions in turn as said deflecting surface for deflecting the light beam emitted by said light source.

8. An optical scanning system according to claim 7, wherein said light deflector and said light-converging device are constructed such that the light beam partly reflected from the light-converging device returns toward at least one of said mirror surfaces adjacent to said deflecting surface but is not reflected toward said object by any of said mirror surfaces including said at least one mirror surface adjacent to said deflecting surface.

9. An optical scanning system according to claim 7, wherein said light deflector and said light-converging device are constructed such that the light beam partly reflected from the light-converging device returns toward said deflecting surface but is not reflected toward said object by any of said mirror surfaces including the deflecting surface.

10. An optical scanning system according to claim 1, wherein said light deflector comprises a mirror having a single mirror surface as said at least one reflecting surface.

11. An optical scanning system according to claim 1, wherein said light-converging device comprises a lens having one of a convex surface and a concave surface as one of two surfaces thereof which is nearer to said light deflector than the other surface thereof.

12. An optical scanning system according to claim 1, wherein each one of said optical members of said light-converging device is spaced from said deflection plane in a same direction as a direction in which the other or others of said optical members is or are spaced from said deflection plane.

13. An optical scanning system according to claim 12, wherein said each one of said optical members of said light-converging device is spaced from said deflection plane in said same direction by a same distance as a distance by which said other or others of said optical member is or are spaced from said deflection plane in said same direction.

14. An optical scanning system according to claim 1, wherein said deflection plane is substantially perpendicular to said at least one reflecting surface of said light deflector.

15. An optical scanning system comprising:

a light source which emits a light beam;

a light deflector having at least one reflecting surface providing a deflecting surface for deflecting said light beam emitted by said light source, in a deflection plane defined by the light beam incident to said light deflector and the light beam deflected by the light deflector, said reflecting surface having two opposite, straight edge lines each of which is parallel to said deflection plane, a center line of said reflecting surface parallel to said two opposite edge lines being spaced from said deflection plane in a first direction perpendicular thereto, and extending parallel thereto; and a light-converging device which receives said light beam deflected by said light deflector and forms an optical image on an object to be scanned, an optical axis of said light-converging device being inclined with respect to said deflection plane so that a deflection amount S of a ghost beam as the light beam partly reflected from the light-converging device, measured from the deflection plane in a second direction opposite to said first direction at a position of said light deflector, satisfies a following expression: $S > W/2 - dW$, where W is a width of said at least one reflecting surface of the light deflector in said first direction and dW is a distance of said center line of said at least one reflecting surface from the deflection plane in said first direction.

16. An optical scanning system according to claim 15, wherein a width of said light deflector equal to said distance between said two opposite edge lines is not smaller than 3 mm.

17. An optical scanning system according to claim 15, wherein said light deflector comprises a polygon mirror having a plurality of mirror surface as said at least one reflecting surface.

18. An optical scanning system according to claim 15, wherein said light-converging device comprises at least one lens, an optical axis of said lens being inclined with respect to said deflection plane.

19. An optical scanning system according to claim 15, wherein said deflection amount S of said ghost beam satisfies a following expression: $2W > S > W/2 - dW$.

20. An optical scanning system comprising:

a light source which emits a light beam;

a light deflector having at least one reflecting surface providing a deflecting surface for deflecting said light beam emitted by said light source, in a deflection plane defined by the light beam incident to said light deflector and the light beam deflected by the light deflector, said reflecting surface having a pair of opposite straight edge lines each of which is parallel to said deflection plane, a center line of said reflecting surface parallel to said opposite edge lines being spaced from said deflection plane in a first direction perpendicular thereto and extending parallel thereto; and a light-converging device which receives said light beam deflected by said light deflector and forms an optical image on an object to be scanned, an optical axis of said light-converging device being spaced from, and extending parallel to, said deflection plane, wherein said optical axis of said light-converging device is translated from said deflecting plane in a second direction perpendicular thereto and opposite to said first direction, by a distance which ensures that a deflection amount S of a ghost beam as the light beam partly reflected from said light-converging device, measured from the deflection plane in said second direction at a position of said light deflector, satisfies a following expression: $S > W/2 - dW$, where W is a width of said at least one reflecting surface of the light deflector in said first direction and dW is a distance of said center line of said at least one reflecting surface form the deflection plane in said first direction.

21. An optical scanning system according to claim 20, wherein said deflection amount S of said ghost beam satisfies a following expression: $2W > S > W/2 - dW$.

22. An optical scanning system according to claim 20, wherein said width of said light deflector equal to a distance between said opposite edge lines thereof is not smaller than 3 mm.

23. An optical scanning system according to claim 20, wherein said light-converging device comprises a lens having a first and a second surface, said lens having an optical axis thereof as said optical axis of the light-converging device, a distance of translation of said optical axis of said lens from said deflection plane and at least one of (a) a distance between said light deflector and said first surface of said lens, (b) a distance between said light deflector and said second surface of said lens, (c) a length of the optical axis of said lens equal to a distance between said first and second surfaces measured on the optical axis of the lens, (d) respective curvatures of said first and second surfaces of said lens, and (e) a refraction factor of said lens being determined such that said deflection amount S of said ghost beam as the light beam partly reflected from each of said first and second surfaces of said lens satisfies said expression: $S > W/2 - dW$.

* * * * *